United States Patent [19]

Lowell et al.

[11] Patent Number: 4,777,566
[45] Date of Patent: Oct. 11, 1988

[54] CAMERA LIGHT AND ACCESSORIES THEREFOR

[75] Inventors: Ross Lowell, New York; Edward Calamai, Pleasantville; Richard Regan, New York, all of N.Y.; Marvin Seligman, Teaneck, N.J.

[73] Assignee: Lowel-Light Manufacturing, Inc., N.Y.

[21] Appl. No.: 88,050

[22] Filed: Aug. 21, 1987

[51] Int. Cl.$^4$ .............................................. G03B 15/02
[52] U.S. Cl. ........................................ 362/3; 362/8; 362/18; 362/283; 362/434
[58] Field of Search .................... 362/3, 8, 16–18, 362/283, 247, 248, 371, 431, 434

[56] References Cited

U.S. PATENT DOCUMENTS

| | | | |
|---|---|---|---|
| 1,744,369 | 1/1930 | Dietz et al. | 362/18 X |
| 3,333,519 | 8/1967 | Padelt | 362/8 X |
| 3,446,951 | 5/1968 | Schmidt | 362/3 |
| 3,852,582 | 12/1974 | Lowell | 362/18 X |
| 4,179,726 | 12/1979 | Aron | 362/17 |
| 4,187,531 | 2/1980 | Lowell et al. | 362/18 X |

Primary Examiner—Ira S. Lazarus
Assistant Examiner—Richard R. Cole
Attorney, Agent, or Firm—McGlew and Tuttle

[57] ABSTRACT

A camera light arrangement includes a light having a rectangular housing and a cylindrical crown connected to the housing. An opening connects the interior of the housing to the interior of the crown. A light bulb support is held in the housing for supporting a light bulb through the opening. The crown comprises a plurality of coaxial rings which define at least one annular slot therebetween. An octogonal accessory frame is removably engaged to the slot and carries accessories, such as opposite pairs of barn door assemblies each comprising a pair of polygonal barn doors. Two of the barn doors are in the form of elongated rectangles which are each pivotably mounted at a single point and the remaining two of the barn doors are substantially triangular in shape and are pivotably mounted at separate locations to the frame. This permits the formation of rectangular openings and slot-shaped openings for light emanating from the crown. A universal mount is connected to the bottom of the housing and can receive a plurality of mounting elements. One of these elements comprises a mounting handle which is made of two parts which are pivotably mounted to each other at one end of two parts. The opposite ends of the two parts contain recesses which are alignable with each other for receiving supports such as video camera handles or the top of a photographic stand.

21 Claims, 8 Drawing Sheets

CAMERA LIGHT AND ACCESSORIES THEREFOR

FIELD AND BACKGROUND OF THE INVENTION

The present invention relates in general to photographic lighting, and in particular to a new and useful camera light and accessories thereof which can be used for video and cine photography.

Camera or photographic lights are known which have brackets and supports for accomodating different external equipment. U.S. Pat. No. 4,187,531 to Lowell, for example, shows a lighting arrangement for photgraphic work which comprises a housing which receives a reflector and which has a movably mounted light bulb for changing the focus of the light emanating from the device. Means for mounting barn doors, umbrella reflectors, and filters are also provided. A graduated scrim is also shown which has different sections for passing different amounts of light.

U.S. Pat. No. 3,852,582 to Lowell, discloses a light for use in photographic work which also includes means for supporting light modifying structures such as barn doors, gel frames, and umbrella reflectors.

A wide variety of professional and amateur photographic equipment is now available including home video cameras. A need exists for a compact, versatile lighting arrangement which can be used both professionally and by amateurs and for both primary and secondary lighting in still photography, cine photography and video photography.

SUMMARY OF THE INVENTION

The present invention is comprised of camera light and accessories therefor which can be used with a wide variety of photographic equipment including video, cine and still cameras.

Accordingly, an object of the invention is to provide a camera light and accessories therefor which includes a generally rectangular housing having a front opening with light bulb support means therein for carrying a light bulb in the opening, plus a generally cylindrical crown having a plurality of coaxial rings which define at least one slot therebetween. The crown carries a reflector for reflecting light from the light bulb. A universal mount is connected to the bottom of the housing which is shaped to accommodate a wide variety of external reflectors such as umbrellas and gel frames, plus to provide a secure supporting for mounting and tilting the light.

Another object of the invention is to provide an accessory frame which can be readily engaged onto the crown of the light and which comprises a polygonal frame for carrying up two pairs of barn doors and additional filters that can be swung in front of the reflector in the crown.

A still further object of the invention is to provide a multi-purpose mounting handle which can be connected to the universal mount of the camera light and which can be used either as a handle or to engage external supporting structures such as the top handle of a video camera or a photographic stand.

A still further object of the invention is to provide a camera light and accessories therefor which are simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
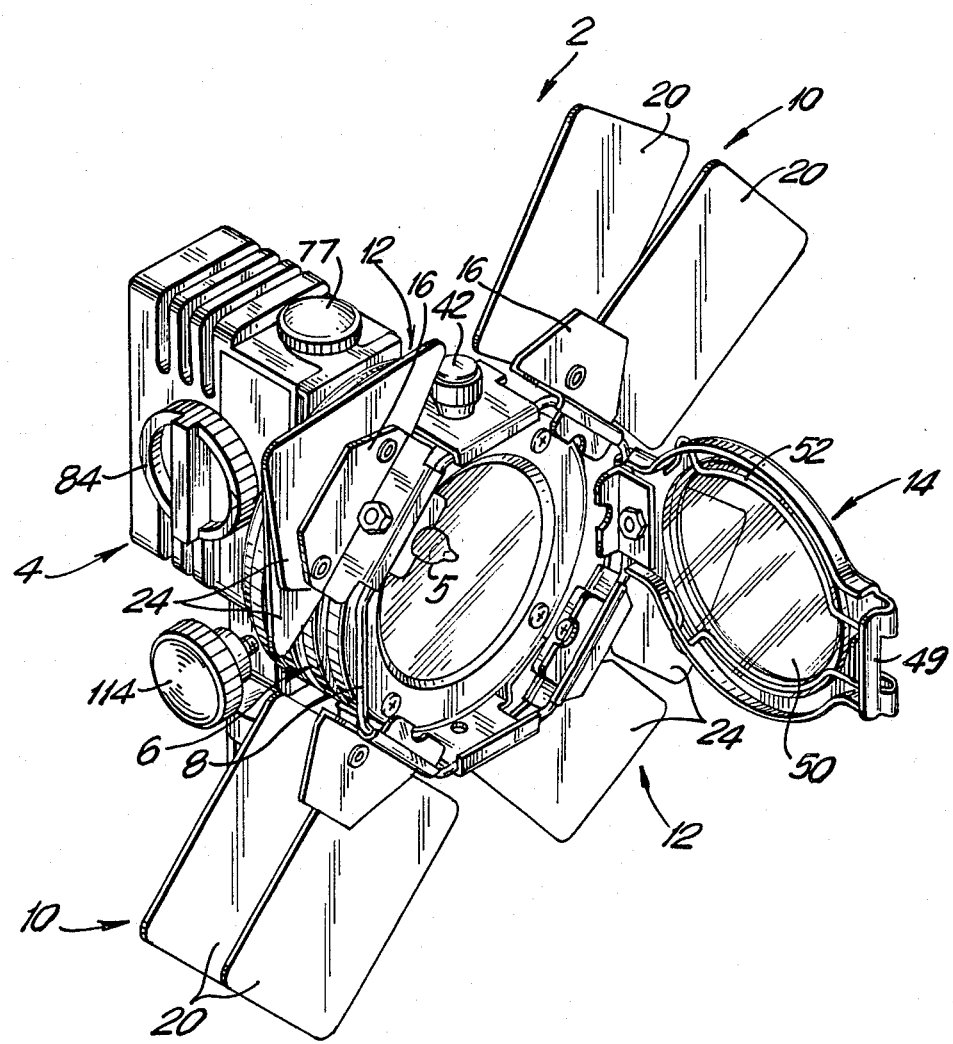
FIG. 1 is a front perspective view of the camera light plus accessories and in accordance with the present invention.
Figure 3:
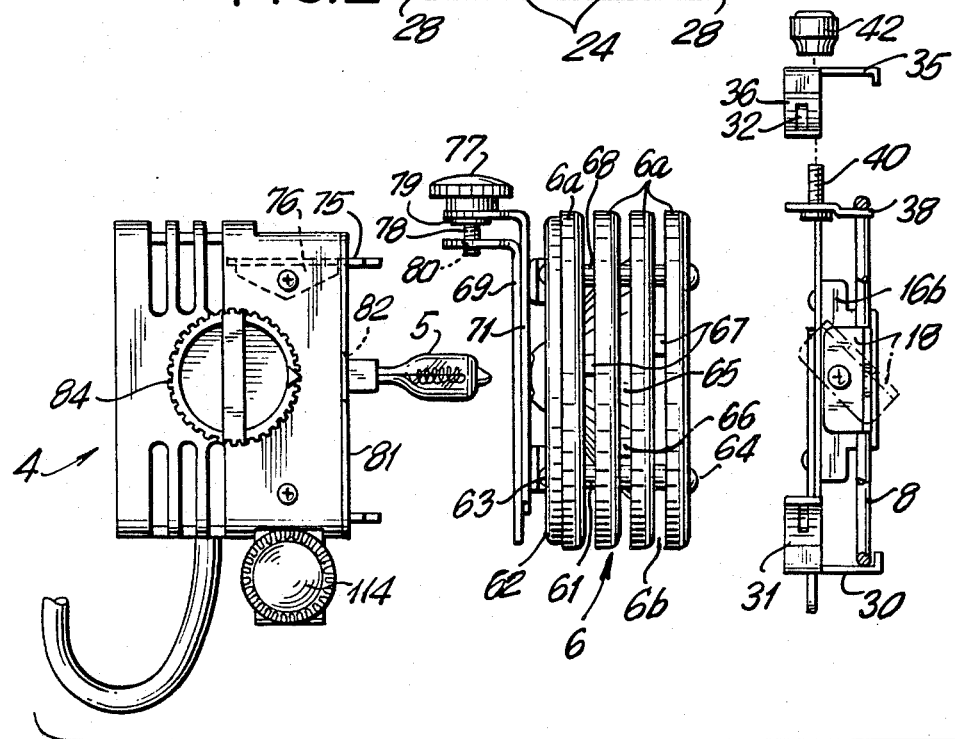
FIG. 3 is a side elevational and exploded view of the light plus accessories shown in FIG. 1.

Referring to the drawings, in particular, the invention embodiment in FIGS. 1 and 3, comprises a photographic light generally designated 2 which includes a rectangular housing 4 having a front opening through which a bulb 5 extends, and a crown assembly 6 which is detachably connected to the front of the housing 4. Crown 6 is made up of a plurality of axially aligned and axially spaced rings 6a which define at least one annular groove 6b therebetween.

Four spacers 61 extend through holes in the rings 6a. A dish-shaped base plate 62 is connected to one end of spacers 61 by four screws 63 and the front ring 6c is connected to the opposite end of the spacers 62 by four other screws 64. A parabolic or otherwise curved reflector 65 is mounted within the three rearmost rings 6a. Three equally spaced tabs 66 and 67 act to maintain spacing between the three rings. Each of the tabs is secured to one of the rings and is meant to bear down against an adjacent ring. Three equally spaced tabs are used for maintaining a space between each ring, so that equal forces are applied to each ring around the periphery of the crown 6.

Reflector 65 is position within the three rings so as to be concentric therewith. A circular glass pane 70 is preferably positioned above the uppermost part of reflector 65. A retaining member associated with front ring 6c includes a plurality of tabs to hold pane 70 and reflector 65 coaxially with respect to the three rings. Retaining screws 64 hold front ring 6c and associated retaining member. Different glass reflector, may be interchanged as desired.

Four spacers 68 are fixed, for example, by rivets, between base plate 62 and an L-shaped plate 69. Two of the spacers 68 are near the top and two are near the bottom of the L-shaped plate 69.

Figure 5:
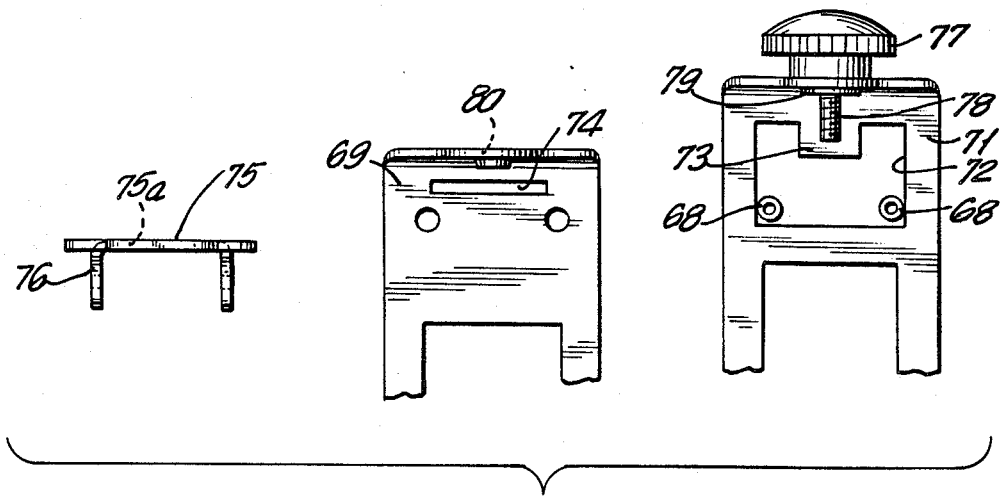
FIG. 5 is an exploded view showing parts of a mounting arrangement for connecting a crown of the camera light to a housing thereof.
Figure 6:
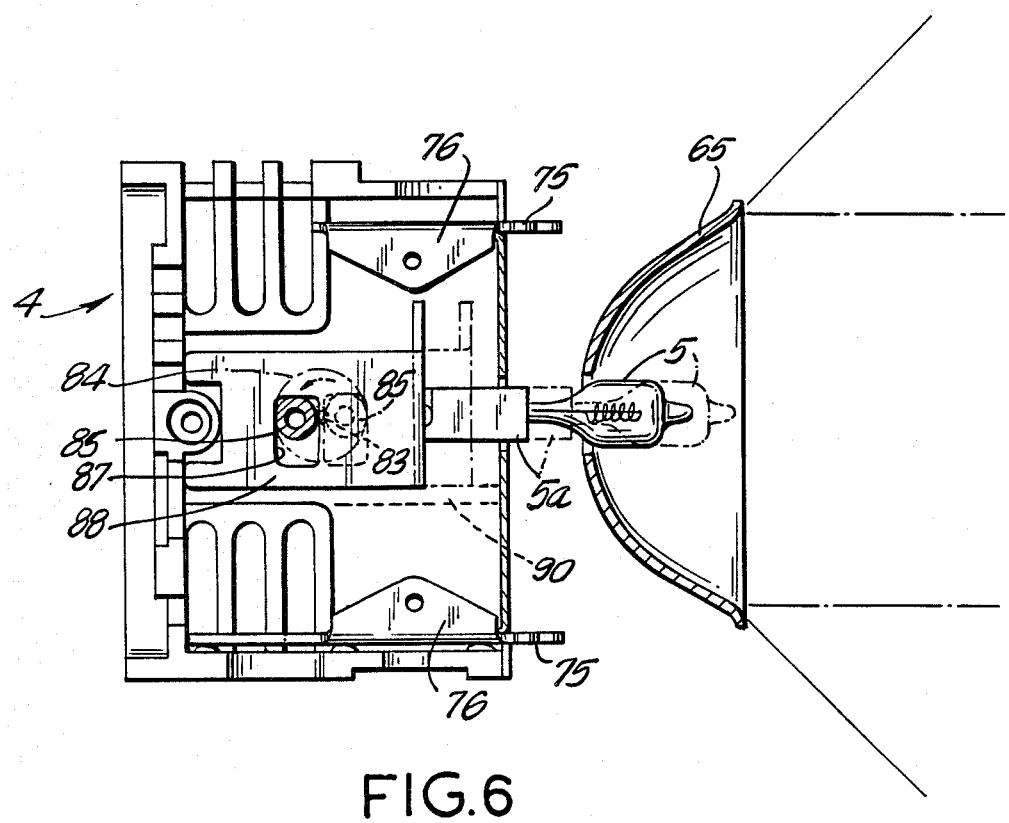
FIG. 6 is a side schematic view showing the interior of one housing part plus a light bulb supporting mechanism therein.

An L-shaped slide 71 is slideably mounted for vertical movement between plates 62 and 69. As also shown in FIG. 5, slide 71 has an opening 72 for accommodating spacers 68. A finger 73 projects into opening 72. L-shaped plate 69 which in FIG. 5 is shown next to slide 71, carries a slot 74 which is sized to receive a tab 75 projecting forwardly from a U-shaped bracket 76. As also shown in FIG. 6, a U-shaped bracket 76 is provided at the top and at the bottom of the housing 4 and has side flanges which have threaded holes for receiving screws. Two halves of housing 4 are connected together by brackets 76.

Returning to FIG. 5, the tab 75 has a vertical side slot 75a which is of a size to receive the finger 73.

The L-shaped slide 71 carries a knob 77 with a threaded bolt 78. Knob 77 is captured for rotation in an opening in the upper leg of slide 71 by a clip ring 79. A threaded hole 80 is provided in the upper leg of L-shaped plate 69 for threadably receiving the bolt 78.

As shown in FIG. 3, to assemble the housing 4 with the crown assembly 6, these two elements are moved toward each other. The tabs 75 are inserted through slots 74 and under fingers 73. By turning knob 77, bolt 78 is screwed into threaded bore 80 to move slide 71 downwardly with respect to plate 69. This moves fingers 73 into slots 75a of brackets 76, firmly connecting the housing to the crown assembly.

A cover plate 81 covers the front opening of the space defined by housing 4 and includes a smaller front opening 82 through which the light bulb 5 extends.

A focusing knob 84 is rotatably mounted about an axis 83 to one part of the housing 4, as shown in FIG. 6. An eccentric round portion 85 projects from the inner surface of knob 84 and through a large hole in the side of housing 4. Eccentric round portion 85 is seated within slot 87 of an L-shaped bracket 88 slideably mounted in the housing 4. Bracket 88 can slide forwardly and rearwardly in the housing and is confined by a pair of rails 90 molded into the interior of the housing. One leg of bracket 88 carries the light bulb 5 and its camp base 5a. By rotating knob 84 in the direction of the arrow in FIG. 6, light bulb 5 can be brought from the solid line position to its phantom line position. Reflector 65 which is held in crown assembly 6, is then functional to change the light from a floodlight effect shown by solid lines to a spotlight effect shown by phantom lights.

Figure 2:
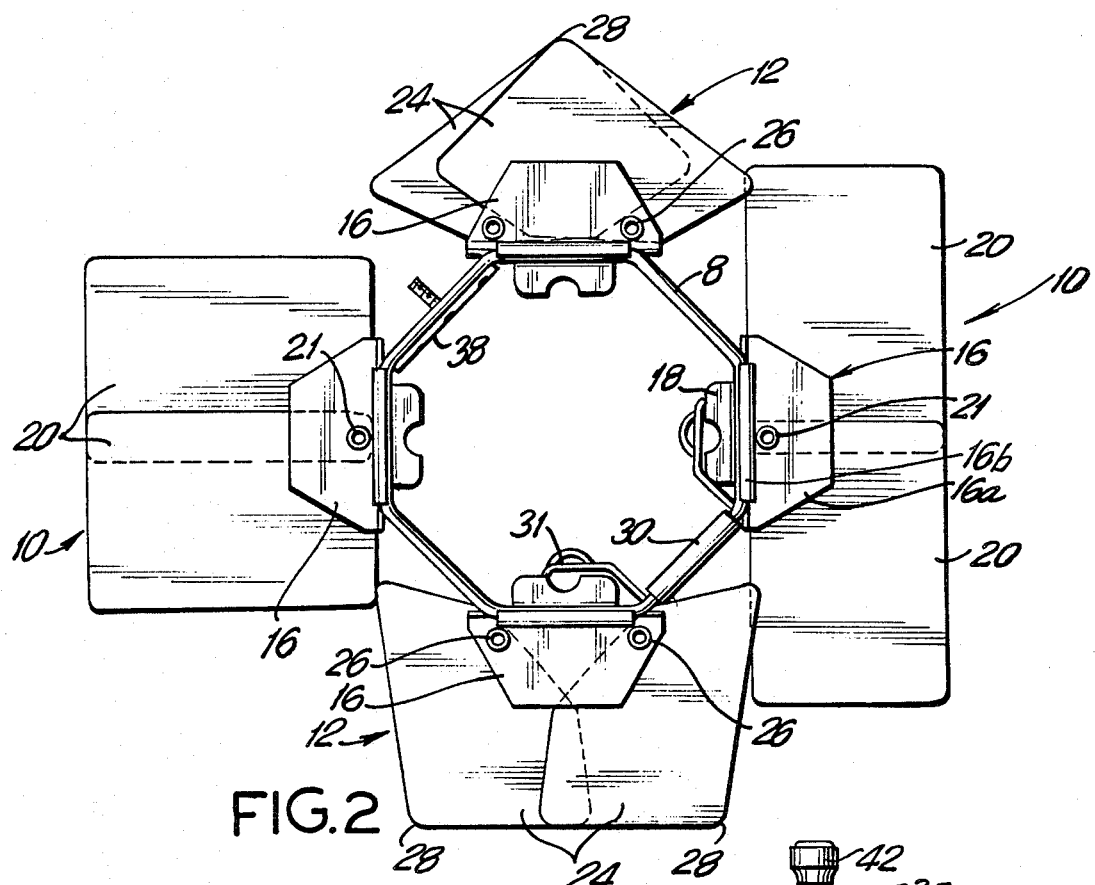
FIG. 2 is a front elevational view of barn doors and frame which is also shown in FIG. 1.

Referring to FIGS. 1 to 4 inclusive, the light of the present invention includes a polygonal, preferably octogonal support frame 8 which is made, for example, of bent wire. Frame 8 includes first and second pairs of opposing sides which carry pairs of barn door assemblies 10 and 12. Barn door assemblies 10 are identical mirror images of each other as are barn door assemblies 12. FIG. 2 shows two distinct configurations which can be achieved by each of the barn door assemblies 10 and 12.

It is noted that with an octogonal support frame 8, four sides are left exposed. One or two of these sides can carry a filter assembly. One of these filter assemblies is shown at 14 in FIG. 1 and in FIG. 18.

Each of the assemblies 10, 12, and 14 are pivotally connected to one side of the octogonal support frame 8.

Each of the barn door assemblies 10 and 12 comprises a barn door bracket 16 having one trapezoidal leg 16a and a leg 16b with a semi-circular channel for receiving one side of frame 8. An L-shaped cover bracket 18 is pivotally connected to the leg 16b and can be pivoted over the side if frame 8 to capture the side between brackets 16 and 18. An intermediate position for bracket 18 is shown in phantom line in FIG. 3.

While the connection between brackets 16 and 18 and the side of the frame 8 is firm, it also permits pivoting of the brackets about the side of the wire frame. In this way, the barn doors can be pivoted, for example, in the position shown in FIG. 4.

Figure 4:
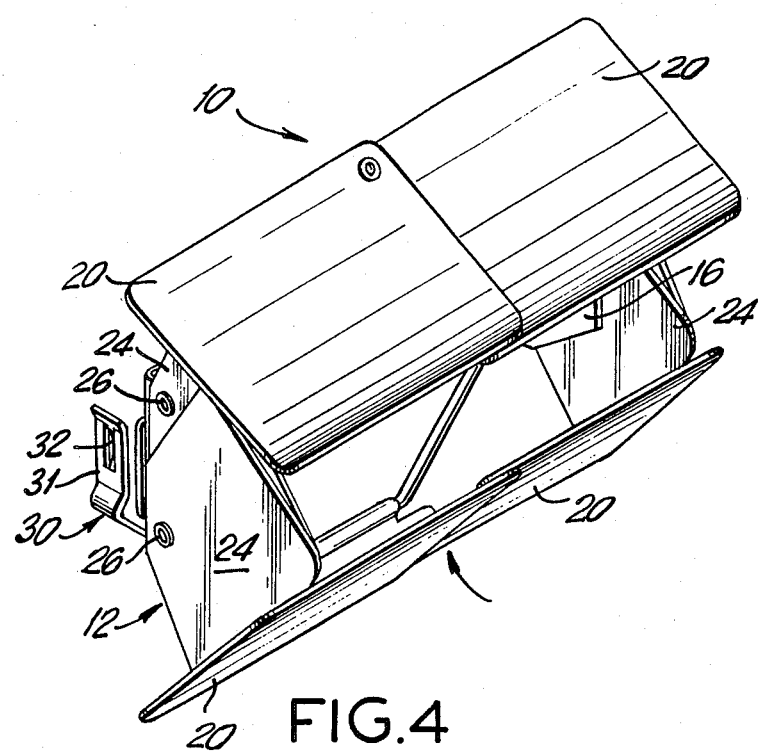
FIG. 4 is a perspective view showing the barn door and frame of FIG. 2 in one of its useful configurations.

The first barn door assemblies 10, as shown in FIGS. 2 and 4, each include a pair of elongated barn doors 20 which are pivotally mounted at a single point 21 to the legs 16a of brackets 16. Pivot point 21 is at one corner of each of the barn doors 20. Each of the second barn door assemblies 12 comprises a pair of substantially triangular barn doors 24 which are pivotally mounted at spaced apart points 26 to the brackets 16. It is noted that brackets 16 for the assemblies 10 and 12 only differ in the position for pivotally mounting their respective barn doors. Otherwise, they are identical for all of the barn door assemblies. All of the cover brackets 18 are identical.

Pivot points 26 are provided near the middle of a long side for the triangular barn doors 24. The barn doors 24 are actually irregular pentagons with three of the short sides of the pentagon lying almost in a straight line. Barn doors 24 are thus correctly describeable as being substantially triangular. The outer corners 28 of the barn doors 24 can be brought together as shown in the top of FIG. 1 to form a substantially triangular overall configuration with the barn doors 24 mostly overlapping each other. As shown at the bottom of FIG. 2, the corners 24 can be brought out by pivoting barn doors 24 on their pivot point 26, to form a substantially rectangular overall shape. The right-hand portion of FIG. 2 shows an elongated rectangular shape that can be achieved with the two rectangular barn doors 20. A substantially square shape is shown on the left-hand side of FIG. 2.

FIG. 4 shows how a substantially closed slot can be formed between the triangular configured barn doors 24 and the rectangularly configured barn doors 20. The inside surfaces of barn doors 20 lie substantially flat against and parallel with side edges of triangular barn doors 24 to laterally close the slot and reduce the leakage of light out of the space defined by the barn doors.

To connect the frame 8 to the crown assembly 6, a fixed bracket 30 (FIGS. 3 and 4) is connected, for example, by brazing or welding, to one side of octogonal frame 8. Bracket 30 carries a pair of wings 31 which each have a projection 32 that is shaped to closely fit within the annular slot 6b between the front two rings 6a of the crown assembly 6. The wings 31 are complimented by a pair of movable wings 36 which are incorporated on a movable bracket 35. Both brackets 30 and 35 are L-shaped and have short legs which can embrace over the outside of a respective side of frame 8.

The movable bracket is engageable over a fixed plate 38 that is connected, for example by welding or brazing, to an upper side of frame 8 as shown in FIG. 3. A threaded bolt 40 is fixably connected to plate 38 and extends upwardly to engage a hole in movable bracket 35. In this way with the wings 31 engaged under the rings 6a, movable bracket 35 can be brought down onto the top of the rings. A threaded nut 42 is then captive onto the upper portion of bolt 40 to press movable bracket 35 downwardly and fix the frame 8 to the front of crown assembly 6.

It is noted that wings 36 also includes projections 37 that engage into annular slot 6b.

Figure 18:
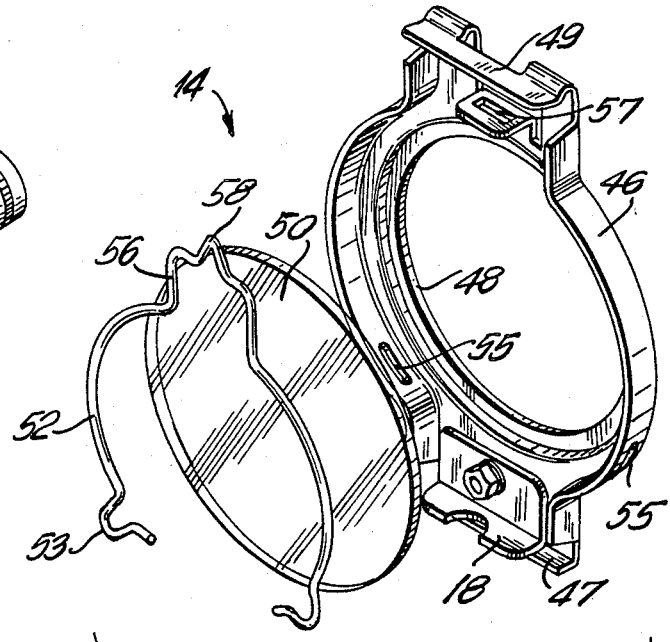
FIG. 18 is a perspective exploded view showing a filter support assembly which can carry a light filter or scrim and which can be pivotally connected to the barn door frame of FIG. 2.

As shown in FIG. 18, the filter assembly 14 comprises a filter frame 46 which has an L-shaped base 47 which is shaped to receive one side of octogonal frame 8. An L-shaped cover bracket 18 which is identical to those used for barn door assemblies 10 and 12, is pivotally mounted to the base 47 and can be pivoted to a position to trap the side of the octogonal frame 8. This permits pivoting of the filter frame 46 about the side of frame 8.

Filter frame 46 includes a large opening 48 with a rim that is slightly smaller in diameter than a filter or scrim 50. Filter or scrim 50 is retained against opening 48 by a spring clip 52 that has lower projections 53 that are connected to short slots 55 in the rim of frame 46. Spring clip 52 also has an upper projection 56 with an upper portion 58 which is fixabley held by a retaining member 57 on a bent portion of frame 46. The upper portion of filter frame 46 has an L-shaped part 49 that embraces around the outside of frame 8.

Figure 7:
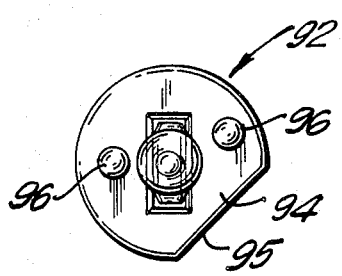
FIG. 7 is a front elevational view of a readily available twelve volt light bulb assembly which can be used in one embodiment of the invention.
Figure 8:
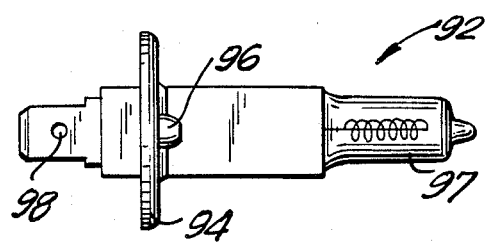
FIG. 8 is a side elevational view of the light bulb assembly shown in FIG. 7.

As shown in FIGS. 7 through 10, instead of fixing the socket 5a of bulb 5 directly to one leg of the L-shaped plate 88, as shown in FIG. 6, a removable bulb assembly 92 as shown in FIGS. 7 and 8 can be provided. Bulb assembly 92 is of the type which is used as a lighting element in some automobile headlights. These light bulb assemblies are available for example from the Osram Company of Germany. They comprise a flange 94 which is round except for a flat area 95. A pair of pins 96 project upwardly from flange 94. The light bulb 97 is fixed to the flange 94 and carries a contact 98 which is of the conventional; type found in automobiles. The other contact comprises a ground contact which is provided through the flange 94.

Figure 9:
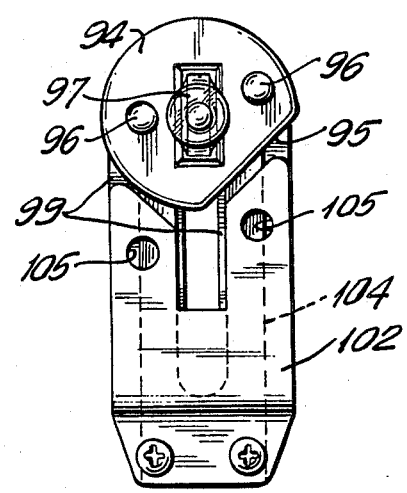
FIG. 9 is a front elevational view showing a mounting arrangement according to the invention which can be used for receiving the light bulb assembly in FIG. 7.
Figure 10:
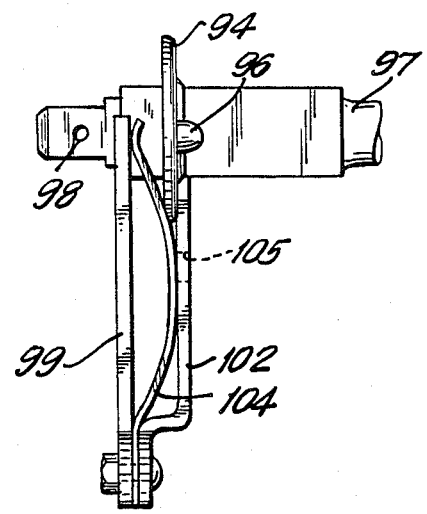
FIG. 10 is a side elevational view of the structure show in FIG. 9.

As shown in FIGS. 9 and 10, a U-shaped support plate 99 is provided which carries a dog leg plate 102. A U-shaped spring 104 is fixed between plates 99 and 102. The legs of dog leg plate 102, as shown in FIG. 9, have a pair of holes 105 which are positioned to receive the pins 96. Flange 94 is slid between spring 104 and plate 102 to secure pins 96 in holes 105. In this position, the contact 98 can then be secured to a wire with another wire secured to any other portion of plates 103 or 99 to provide the other electrical connection.

Figure 11:
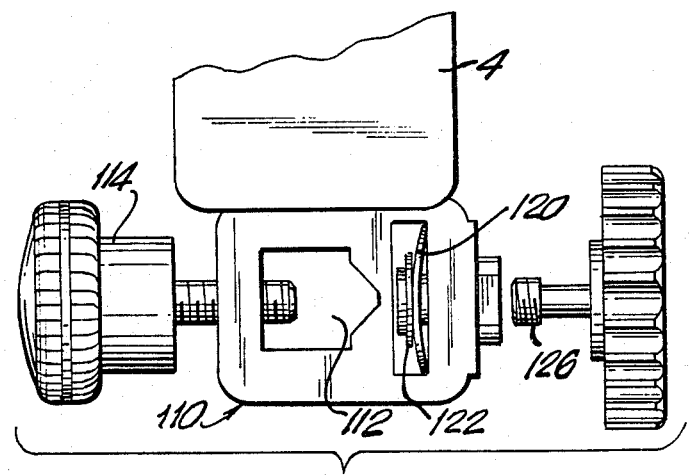
FIG. 11 is a front elevational view of a universal mounting bracket which is connected to the bottom of the camera light housing according to the present invention.
Figure 12:
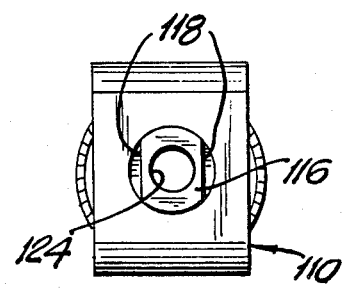
FIG. 12 is a side elevational view of the universal mounting bracket.
Figure 11A:
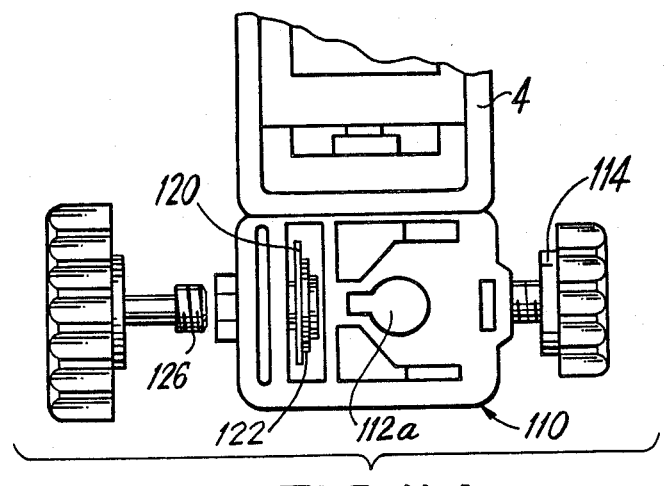
FIG. 11a is a rear elevational view of the universal mounting bracket of FIG. 11.

Turning now to FIGS. 11 and 11a, a universal mounting bracket 110 is shown secured, for example by a screw, to the bottom of housing 4. The mounting bracket 110 includes a polygonal through holes 112 with a triangular portion at a rectangular portion. The rear portion of the mounting bracket 110, as shown in FIG. 11a, includes a a keyhole-shaped opening which will, for example, allow for firm engagement of any accessory which contains a cylindrical portion that is usable for mounting. A knob with threaded bolt 114 is threaded into one side of bracket 110 which extends into through holes 112 to secured a cylindrical or flat blade-shaped member in the through hole 112.

A cylindrical post 116 with opposite flat areas 118 is rotatably mounted in a side of bracket 110. A cup spring 120 engages cylinder 116 and is retained by a ring clip 122. Post 116 also has a threaded bore 124 in its end which can receive the threaded bolt of a threaded bolt plus knob combination 126.

Figure 13:
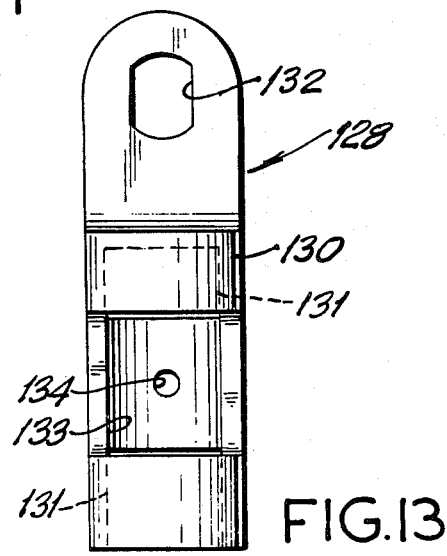
FIG. 13 is a side elevational view of a stand link that can be connected to the universal mounting bracket of FIG. 12.

FIG. 13 shows a support plate 128 of a stand link 130 which has a specially shaped hole 132 with cylindrical ends and flat sides that closely embrace the cylindrical post 116. Post 116 thus can only rotate along with rotation of plate 128. By tightening bolt and knob combination 126 into the threaded bore 124 of post 116, post 116 is pulled to the right as shown in FIG. 11 against the bias of cup spring 120. This prevents any rotation between post 116 and mounting bracket 110 to fix the rotational position between the link 130 and the mounting bracket 110. It is noted that additional link elements can be provided for connecting the light housing, such as L-shaped brackets, handles, stand fittings, plate-shaped brackets and the like. These brackets or plates need only have shaped hole 132, to be engageable by post 116.

Stand link 130 has a pair of straps 131 which engage over an opening 133 which is shaped to receive the top post of a photographic stand (not shown). A threaded bore 134 is provided at the back of opening 133 to receive a threaded bolt that can be threaded against a stand post in the opening 133. FIGS. 14 through 17 show a camera light mounting handle generally designated 140 which comprises a pair of handle members 142 and 144. Each of the members 142 and 144 have a C-shaped cross section and, with the handle members together as shown in FIG. 16, define an inner space. The upper end of members 142 and 144 include molded complementing gear segments 146 with complimenting gear and groove areas which mesh with each other to maintain alignment between the upper ends of members 142 and 144, while permitting these two members to pivot with respect to each other at their upper ends.

Each of the handle members also includes slots 148 at their upper ends with semi-cylindrical outside basis which are shaped to receive semi-cylindrical portions 150 and 152 of a pair of overlapping plates 154, 156. Each of these plates 154 and 156 extends through its respective slot 148. Slots 148 are at slightly different heights to permit plates 154 and 156 to overlap each other. An L-shaped bracket 158 is disposed between plates 154 and 156. The upper half of semi-cylindrical portion 152 has a cut-out 152a for receiving one leg of L-shaped bracket 158. In their overlapping position, bores in plates 154 and 156 and the leg of bracket 158 align with each other. A bolt 160 is then engaged upwardly through these aligned holes and is secure by a lock nut 162.

Figure 17:
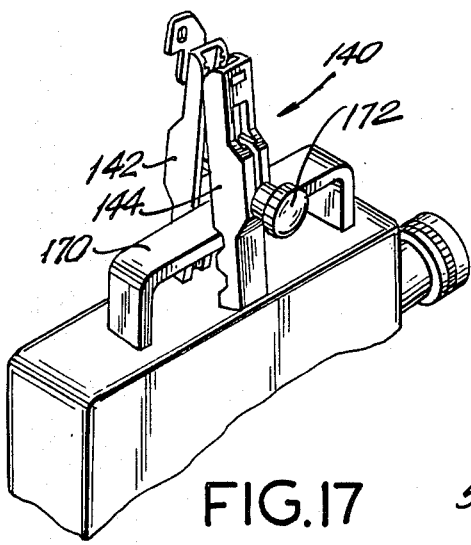
FIG. 17 is a perspective view showing the handle of FIG. 14 in a position engaging the top handle of a video camera.

The semi-cylindrical portions 150 and 152 permit relative pivoting of the handle member 142 and 144. At that same time, bracket 158 is held in an upright position as shown in FIG. 17. A second leg of bracket 158 includes an opening of 158a which is shaped to receive the cylindrical post 116 of the universal mounting bracket 110 shown in FIG. 11.

At their lower ends, handle member 142 and 144 include alignable small recesses 164 and alignable large recesses 166. In the position shown in FIG. 16, the pair of recesses 164 and 166 form substantially closed channels which can be used to engage each of small and large diameter external supports, for example, the small and large diameter portions of a photographic stand or tripod.

Figure 15:
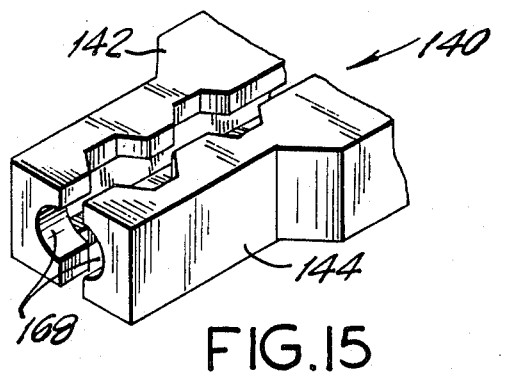
FIG. 15 is a partial perspective bottom view of the handle of FIG. 14.
Figure 16:
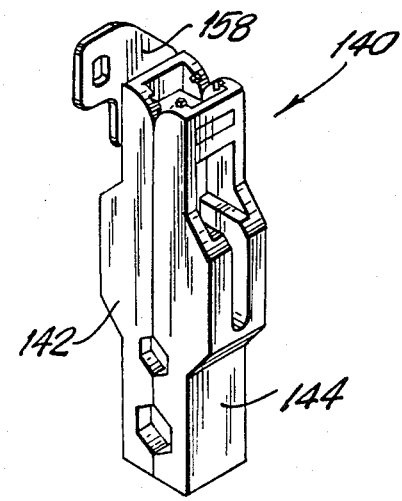
FIG. 16 is a side perspective view of the handle of FIG. 14 in its assembled and closed condition.

As shown in FIG. 15, the bottoms of handle member 142 and 144 also include alignable recesses 168 which can be used to engage the top post of the stand with the mounting handle in an upright position.

The large or the small recesses 164 and 166 can be used to engage the opposite sides of a video camera handle 170 shown in FIG. 17.

In this position, a threaded bolt plus knob combination 172 is used to force the lower ends of handle members 142 and 144 together.

Figure 14:
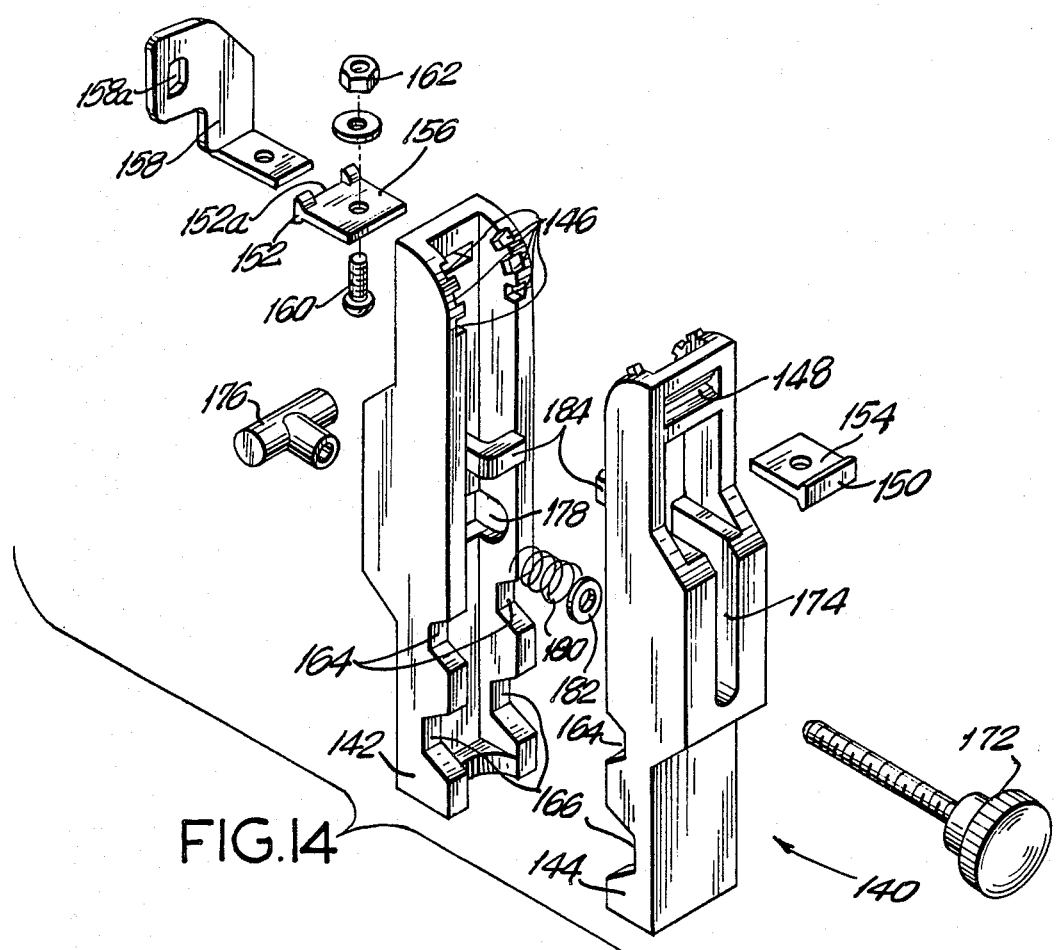
FIG. 14 is an exploded perspective view showing a mounting handle in accordance with the present invention.

As shown in FIG. 14, the threaded position of bolt plus knob combination 172 extends through a slot 174 in the second handle member 144 and is threadable into the threaded bore of a T-shaped nut 176. T-shaped nut 176 is pivotally mounted to the first handle member 142 in a semi-circular recess 178. A spring 180 and a washer 182 are engaged between handle members 142 and 144 and receive the threaded portion of threaded bolt plus knob and combination 172.

In its horizontal position, knob 172 lies in a small end of slot 174. Knob 172 can also be pivoted up into a vertical position where the knob head of knob 172 extends into an upper large portion of slot 174 and into the space defined between handle members 142 and 144. To retain knob 172 in this upright position, hook portions 184 are provided on each of the handle members 142, 144. These portions engage on opposite sides of the threaded part of knob 172 to hold it in its upright position.

Figure 19:
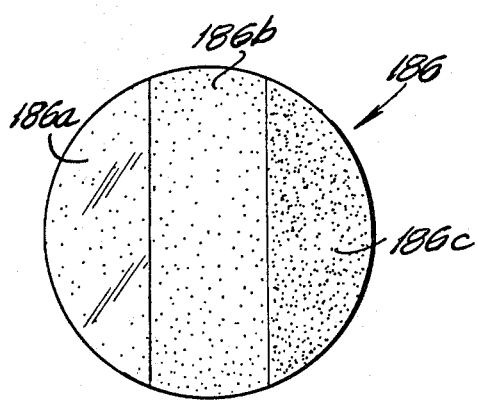
FIG. 19 is a front elevational view of a graduated scrim.
Figure 20:
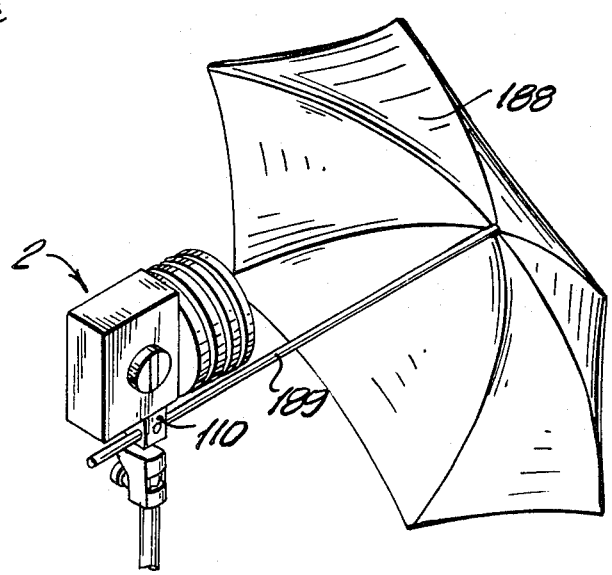
FIG. 20 is a rear perspective view showing the camera light of the present invention used in conjunction with an external umbrella reflector.

FIG. 19 shows a scrim or screen 186 having an open transparent portion 186a, a slightly opaque portion 186b and a more opaque portion 186c. This produces a graduated effect which permits the shedding of more light on one side of a scene and less light on an opposite side of the scene.

FIG. 10 shows how a reflecting umbrella 188 with a shaft 189 can be used in conjunction with the light 2. The shaft 189 extends through the opening of the universal mounting bracket 110 and is secured by the threaded knob 114 (FIG. 11).

In the same way, a collapsible gel frame with that ended shaft can be engaged in the universal mounting bracket.

While specific embodiments of the invention have been shown and described in detail to illustrate the application of the principles of the invention, it will be understood that the invention may be embodied otherwise without departing from such principles.

What is claimed is;

1. A camera light arrangement comprising:
   a housing defining a space and having a front opening;
   light bulb support means in said housing for supporting a light bulb in said front opening;
   a crown assembly connected to said housing and disposed around said front opening, said crown assembly including a plurality of coaxial rings defining at least one annular slot therebetween, and a reflector connected to said rings with a rear opening communicating with said front opening for receiving a light bulb carried by said light bulb support means; and
   a universal mounting bracket connected to said housing, said universal mounting bracket including a bracket member having an opening therein and a cylindrical post rotatably mounted in said opening.

2. An arrangement according to claim 1, including a pair of tabs connected to a front of said housing on opposite sides of said front opening, each tab having a slot therein, said crown assembly including a fixed plate having a pair of slots for receiving said pair of tabs and a slide slideably mounted to said fixed plate and including a pair of openings each with a finger, each finger being shaped to extend into a slot of one tab with relative movement between said slide and said fixed plate with said tabs extending in said slots of said fixed plate.

3. An arrangement according to claim 2, wherein said fixed plate and said slide are both L-shaped and include a short leg and a long leg, said long leg of said fixed plate carrying said slots thereof, said long leg of said slide carrying said openings thereof, a threaded bolt rotatably mounted to said short leg of said slide, said short leg of said fixed plate having a threaded opening for threadably receiving said bolt, rotation of said bolt causing relative sliding movement between said slide and said fixed plate.

4. An arrangement according to claim 1, wherein said light bulb support means comprises a bracket slideably mounted in said housing for movement toward and away from said front opening, a knob rotatably mounted to said housing about an axis and carrying an eccentric round portion eccentrically located with respect to said axis, said bracket having a slot therein, said round portion extending in said slot for moving said bracket toward and away from said front opening with rotation of said knob, and light bulb socket means carried by said bracket for receiving a light bulb.

5. An arrangement according to claim 4, wherein said light bulb support means comprises a support plate connected to said bracket, a dog leg plate fixed to said support plate, a spring connected between said support plate and said dog leg plate having a portion resiliently engaged against said dog leg plate, said dog leg plate having a pair of legs each with an opening therein, and a light bulb having a light bulb flange with a pair of pins engageable in said holes of said legs and being urged against said legs by said spring.

6. An arrangement according to claim 1, wherein said light bulb support means comprises a support plate connected to said housing, a dog leg plate fixed to said support plate, a spring connected between said support plate and said dog leg plate having a portion resiliently engaged against said dog leg plate, said dog leg plate having a pair of legs each with an opening therein, and a light bulb having a light bulb flange with a pair of pins engageable in said holes of said holes of said legs and being urged against said legs by said spring.

7. An arrangement according to claim 1, wherein said universal mounting bracket includes a polygonal hole therethrough which extends perpendicularly to said opening through which said cylindrical post extends, and a threaded bolt plus knob combination having a threaded portion threaded to said mounting bracket and extending into said polygonal hole.

8. An arrangement according to claim 1, including an accessory frame detachably connected to said crown assembly, said accessory frame comprising a polygonal frame member having first and second pairs of opposing sides.

9. An arrangement according to claim 8, wherein said accessory frame comprises a first barn door support pivotally mounted to each one of said first pair of sides, a second barn door support pivotally mounted to each one of said second pair of sides, a pair of elongated rectangular barn doors pivotally mounted at one point to each one of said first barn door supports, said one point being at a corner of each rectangular barn door, and a pair of substantially triangular barn doors each pivotally mounted of spaced apart points to each of said second barn door supports, said spaced apart points each being on a long side of one of said substantially triangular barn doors.

10. An arrangement according to claim 9, wherein said polygonal frame member comprises an octogonal frame member including four exposed sides between said first and second pairs of opposite sides to which said first and second barn door supports are pivotally mounted, a fixed bracket connected to one of the exposed sides and having a pair of opposite wings each with inwardly extending projections extending inwardly of said frame member, said projections being shaped to engage into said annular slot of said crown assembly, and a movable bracket movably mounted to another one of said exposed sides opposite to said exposed side to which said fixed bracket is connected, said movable bracket having a pair of wings each with inwardly extending projections shaped to engage into said annular slot of said crown assembly, said fixed and movable brackets connecting said polygonal frame member to said crown assembly.

11. An arrangement according to claim 10, including a filter frame pivotally mounted to one of said exposed sides, said filter frame having an opening therein, a filter engaged against said opening of said filter frame and a spring clip engaged against said filter and to said filter frame, said spring clip having a pair of lower projections projecting into lower slots in said filter frame and an upper projection projecting into an upper slot of said filter frame, said filter frame having an L-shaped part for engaging around an exposed side of said frame member which is opposite said exposed side to which said filter frame is pivotally connected.

12. An arrangement according to claim 11, wherein said upper projection projects into engagement with said exposed side of said frame member which is opposite from said exposed side to which said filter frame is pivotally connected.

13. An arrangement according to claim 1, including a mounting handle detachably connected to said universal mounting bracket, said mounting handle comprising first and second handle members each having opposite ends, said handle members being shaped to define an elongated space therebetween, said second handle member having a slot therethrough, said handle members being pivotally connected to each other at one of said opposite ends thereof, each handle member at least one recess near the other one of its opposite ends, said recesses being aligned with said handle members together to form a support channel for engaging a support structure, a T-shaped nut pivotally mounted to said first handle member, a bolt having one end threaded into said nut and an opposite end, a knob connected to said opposite end of said bolt, said slot in said second handle member having a large end through which said knob is movable to position said knob and bolt in said space, said slot having a small end for receiving said bolt and against which said knob is engageable for holding said handle members together.

14. An arrangement according to claim 13, wherein each of said handle members has a C-shaped cross section, each of said handle members having mating gear segments near said one end thereof which are engaged with each other for maintaining alignment of said handle members with relative pivotal movement between said handle members, a spring engaged between said handle members, said bolt extending through said spring, and a hook portion connected to each handle member extending inwardly of said space for engaging said bolt with said bolt in said space.

15. A barn door frame for camera light, comprising a polygonal frame member having first and second pairs of opposing sides, a first barn door support pivotally mounted to each of said first pair of sides, a second barn door support pivotally mounted to each one of said second pair of sides, a pair of elongated rectangular barn doors both pivotally mounted at one point to each of said barn doors, said one point being at a corner of each rectangular barn doors, and a pair of substantially triangular barn doors each pivotally mounted of spaced apart points to each of said second barn door supports, said spaced apart points each being on a long side of one of said substantially triangular barn doors.

16. A barn door frame according to claim 15, wherein said polygonal frame member comprises an octogonal frame member including four usable sides between said first and second pairs of opposite sides to which said first and second barn door supports are pivotally mounted, a fixed bracket connected to one of the exposed sides and having a pair of opposite wings each with inwardly extending projection extending inwardly of said frame member, and a movable bracket movably mounted to another one of said exposed sides opposite to said exposed side to which said fixed bracket is connected, said movable bracket having a pair of wings each with inwardly extending projections, whereby said fixed and movable bracket can be engaged onto a crown assembly of a camera having a pair of rings defining an annular slot therebetween said projections of said wings wing being engageable in the annular slot.

17. A barn door frame according to claim 16, including a filter frame pivotally mounted on said exposed sides, said filter frame having an opening therein, a filter engaged against said opening of said filter frame and a spring clip engaged against said filter and to said filter frame, said spring clip having a pair of lower projections projecting into four slots in said filter frame and an upper projection projecting into an upper slot of said filter frame, said filter frame having an L-shaped part for engaging around an exposed side of said frame member which is opposite said exposed side to which said filter frame is pivotally connected.

18. A barn door frame according to claim 17, wherein said upper projection projects into engagement with said exposed side of said frame member which is opposite from said exposed side to which said filter frame is pivotally connected.

19. A mounting handle for mounting a camera light, comprising first and second handle members each having opposite ends, said handle members being shaped to define an elongated space therebetween, said second handle member having a slot therethrough, said handle members being pivotally connected to each other at one of said opposite ends thereof, each handle member having at least one recess near the other one of its opposite ends, said recess being aligned with said handle members together to form a support channel for engaging a support structure, a T-shaped nut heavily mounted to said first handle member, a bolt having one end threaded into said nut and an opposite end, a knob connected to said opposite end of said bolt, said slot in second handle member having a large end through whcih said knob is mountable to position said knob and bolt in sadi space, said slot having a small end for receiving said bolt and against which said knob is engageable for holding said handle members together.

20. A mounting handle according to claim 19, wherein said handle members have a C-shaped cross section, each of said handle mebers having mating gear segmens near said one end thereof which are engaged with each other for maintaining alignment of said handle member with relative pivotal movement between said handle members, a spring engaged between said handle membersm said bolt extending through said spring, and a hook portion connected to each handle member extending inwardly of said space for engaging said bolt within said bolt in said space.

21. A mounting handle according to claim 20, wherein each handle member includes a slot-shaped opening near said one end thereof with a semi-circular base, overlapping mounting plates engaged into said slots each having semi-circular bases pivotally engaged in said semi-circular bases of said slot-shaped openings, and a mounting plate connected to said overlapping plates and extending outwardly, said handle members for connection to a camera.

* * * * *